(12) United States Patent
Delmer

(10) Patent No.: US 6,440,510 B1
(45) Date of Patent: Aug. 27, 2002

(54) IRRIGATION HOSE SPLICE

(76) Inventor: Daniel W. C. Delmer, 16901 Bedford La., Huntington Beach, CA (US) 92649

( * ) Notice: Subject to any disclaimer, the term of this patent is extended or adjusted under 35 U.S.C. 154(b) by 0 days.

(21) Appl. No.: 09/522,451

(22) Filed: Mar. 9, 2000

Related U.S. Application Data

(62) Division of application No. 09/071,524, filed on May 1, 1998, now Pat. No. 6,090,233.

(51) Int. Cl.[7] ............................................. F16L 13/00
(52) U.S. Cl. ....................... 428/35.7; 428/36.9; 285/5; 285/15
(58) Field of Search .................... 428/34.1, 35.7, 428/36.9, 36.91, 34.6, 34.7; 156/94, 308.4; 277/314, 316; 285/5, 6, 15

(56) References Cited

U.S. PATENT DOCUMENTS

| | | |
|---|---|---|
| 3,635,504 A | 1/1972 | Borden et al. |
| 3,666,586 A | 5/1972 | Lacey ................. 156/304.3 X |
| 3,998,682 A | 12/1976 | Harmsen ..................... 156/158 |
| 4,032,176 A | 6/1977 | Tabary ......................... 285/18 |
| 4,092,193 A | 5/1978 | Brooks ......................... 156/83 |
| 4,215,516 A | 8/1980 | Huschle et al. ...... 156/304.3 X |
| 4,610,742 A | 9/1986 | Rop et al. ................... 156/158 |
| 4,630,846 A | 12/1986 | Nishino et al. ............... 285/21 |
| 4,636,272 A * | 1/1987 | Riggs ......................... 156/158 |
| 4,736,775 A | 4/1988 | Oxley ......................... 138/118 |
| 4,801,349 A | 1/1989 | Dommer et al. ............. 156/503 |
| 4,906,313 A | 3/1990 | Hill ............................. 156/158 |
| 5,141,580 A | 8/1992 | Dufour et al. ............... 156/158 |
| 5,175,032 A | 12/1992 | Steele et al. ................ 428/34.9 |
| 5,592,726 A | 1/1997 | Suresh |
| 5,634,751 A | 6/1997 | Stencel et al. |

FOREIGN PATENT DOCUMENTS

EP 116019 8/1984 .................. 156/158

OTHER PUBLICATIONS

Disclosure, "Prior Art"—Hose Splice (Jul. 1999).

* cited by examiner

Primary Examiner—Michael W. Ball
Assistant Examiner—Gladys Piazza
(74) Attorney, Agent, or Firm—Stetina Brunda Garred & Brucker

(57) ABSTRACT

An irrigation hose splice and method of making the same that permits used irrigation hose to be reinstalled and retrieved in the same manner as new irrigation hose. The method of splicing includes providing two segments of unjoined irrigation hose. Inserting a heat shield into a first segment to prevent its inner circumferential surface from fusing together when the first hose segment is later fused with a second hose segment. Inserting the first hose segment into the second hose segment, creating an area where the two segments overlap. Appying heat and compression simultaneously at the overlapping area to fuse together the first and second hose segments, creating an irrigation hose splice which is composed of material from the first hose segment and the second hose segment that have been fused together.

8 Claims, 2 Drawing Sheets

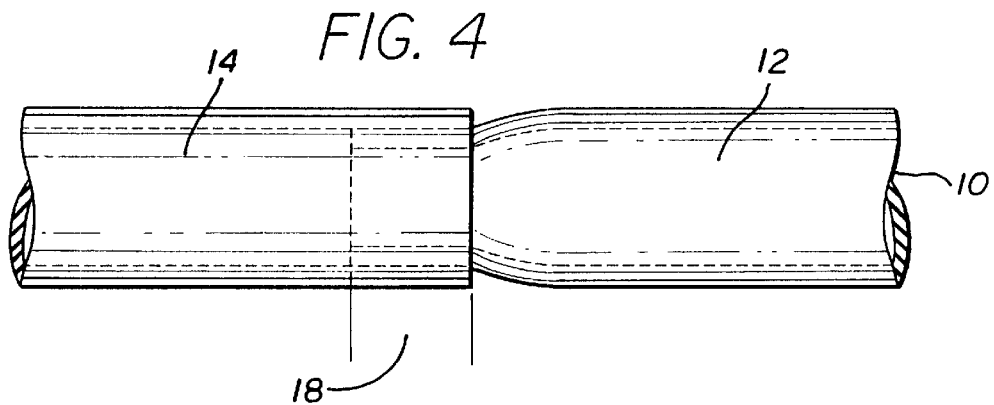
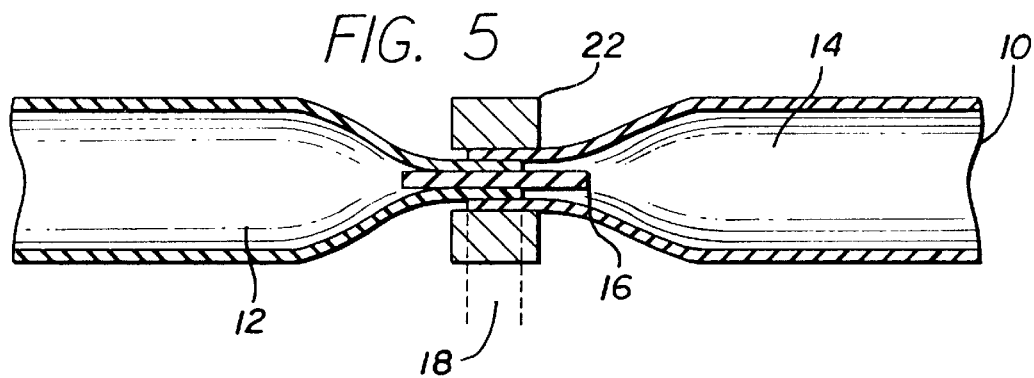
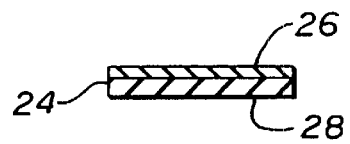
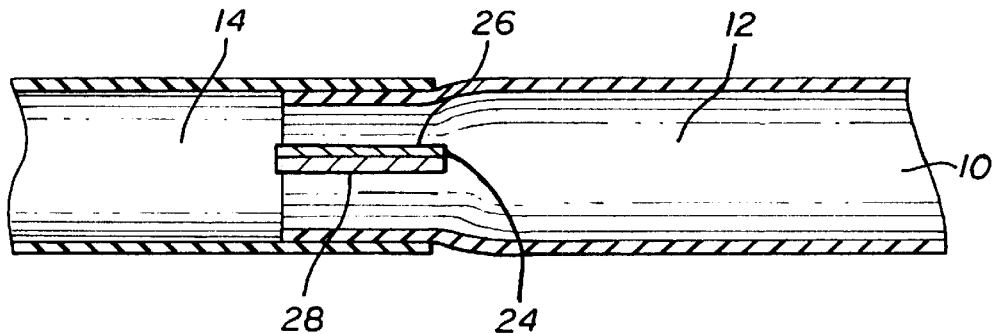

IRRIGATION HOSE SPLICE

This application is a divisional application of co-pending U.S. patent application Ser. No. 09/071,524, entitled IRRIGATION HOSE SPLICE AND METHOD OF MAKING SAME, filed May 1, 1998, now U.S. Pat. No. 6,090,233.

BACKGROUND OF THE INVENTION

The present invention relates to agricultural irrigation, and more specifically, to an irrigation hose splice and method of making such a splice, including irrigation hose splices for irrigation hoses known as "drip tape" which are used to irrigate crops by distributing water substantially uniformly at discreet locations spaced along the length of the tape.

Drip tapes are more easily rolled, transported, and stored than are hoses which remain always round in cross section. Moreover, drip tape has become increasingly popular in row-crop farming because water is distributed to the soil immediately adjacent to the growing plants, and the entire field need not be irrigated. Strawberry growers, in particular, have almost uniformly adopted the use of drip tape.

A major problem hindering the further use of drip tape for agricultural irrigation of major crops is the cost of replacing drip tape or repairing existing drip tape. For example, most major crops have a value per acre that does not justify the continual replacement cost of new drip tape or the labor costs associated with the retrieval and reinstallation of used drip tape using conventional methods. One exception is strawberry growers who almost unanimously discard the old drip tape and replace it with new drip tape with each annual planting. Strawberries have a high cash value per acre, and therefore the cost of replacing drip tape is economically justifiable.

In addition to the cost of replacing drip tape with each crop, discarded drip tape is environmentally unfriendly. For example, one acre of strawberries requires approximately 12,000 to 16,000 linear feet of drip tape depending on the row spacing. Because drip tape is replaced with each crop, which is every year for strawberries, landfills are increasingly becoming strewn with used drip tape.

Over time the repeated installation and retrieval of used drip tape results in an increasing number of unjoined segments. Typically, there are many unjoined segments on the retrieved drip tape spool, even after only one use, because the drip tape segments are only as long as the particular row from which they are retrieved. Since the row lengths generally vary, the used drip tape segment upon reinstallation will most probably require a coupling because the used segment will likely be too long or too short for the new row length. This problem is compounded with each additional retrieval and reinstallation. Eventually, the high cost of the couplings and installation labor make the further use of used drip tape economically unviable.

Conventional repair methods for flexible hoses incorporate the use of injection molded plastic couplings to splice together the unjoined pieces of flexible hoses. Examples of such couplings are those sold by Agricultural Products Inc. under the designation TAPELOC FITTINGS™. However, in addition to the cost of these couplings, these couplings must be removed each time the hose is retrieved because the coupling is rigid and therefore can damage the hose as the hose coils on the take-up spool. Removing the plastic couplings and reinstalling them each time the hose is re-used is time consuming and expensive, and thus limits the viability of re-using irrigation hoses as the required number of plastic couplings increases with each crop. Another disadvantage is that the coupler has a diameter smaller than the adjoining hoses and therefore can have a flow reducing effect.

Alternatively, another method of repairing hoses is described in U.S. Pat. No. 3,635,504 issued on Jan. 18, 1972. Two hose sections are spliced together by cutting their ends diagonally, telescoping them over a fabric-reinforced uncured rubber sleeve, placing uncured rubber against the sleeve to fill a gap between the hose sections, bridging between the outer surfaces of the hose sections with a strip of uncured rubber, and curing the uncured rubber elements while applying compressive forces. This method, like the method involving rigid couplers, is time consuming and therefore similarly impractical as the number of segments requiring repair increases.

In view of the above, it should be appreciated that there is still a need for an irrigation hose splice and method of making such a splice that can be accomplished in a consistent manner with minimal amount of time and equipment, and results in an irrigation hose that can be installed and retrieved in the same way as new or undamaged hose. The present invention satisfies these and other needs and provides further related advantages.

SUMMARY OF THE INVENTION

The present invention relates to an irrigation hose splice and method of making the same, including a hose splice for drip tape, requiring minimal time and equipment. Moreover, the present invention allows the repaired irrigation hose to be retrieved and re-installed in the same manner as new or undamaged hose. Finally, the present invention is environmentally friendly in that it reduces the amount of irrigation hose discarded with each crop.

The method of making an irrigation hose splice includes inserting a first hose segment into a second hose segment so that the first hose segment is completely circumscribed by the second hose segment. This creates an overlapping area preferably less than one inch in length. The first and second hose segments are then fused together by externally applying heat and pressure at the overlapping area to create an irrigation hose splice. The irrigation hose splice is then cooled.

An important feature of the present invention is the insertion of a heat shield into the first hose segment, i.e., the hose segment that is completely circumscribed by the second hose segment. During the fusing process, the heat shield prevents the inner circumferential surface of the first segment from sealing onto itself which would restrict fluid flow within the irrigation hose. This results in a repaired irrigation hose that can withstand greater longitudinal forces, especially prevalent during installation and retrieval. Further, the heat shield itself may contain a layer of hose material in addition to the heat resistant material. This may be especially desirable when repairing multi-chambered flexible hosing because the additional hose material in the heat shield prevents the circumferential portions of the hose segments that are not multi-chambered from being damaged by the application of heat and pressure required to fuse together the thicker adjacent portions of the hose (i.e., those portions along the circumference which are multi-chambered). The use of such a heat shield results in an irrigation hose splice that can withstand greater longitudinal forces, especially prevalent during installation and retrieval of the irrigation hose.

Another important feature of the present invention is that the heat shield may be water soluable such that the heat shield remaining in the irrigation hose can be removed by dissolving it with water during irrigation. Alternatively, the heat shield can be forced out by flushing the hose prior to use.

Another important feature of repairing irrigation hose in this manner is that the irrigation hose can be repaired in the field during retrieval and recoiling of the irrigation hose. This allows for installation of the repaired irrigation hose in the same manner as new hose. Other features and advantages of the present invention will become apparent from the following description of the preferred embodiments, taken in conjunction with the accompanying drawings, which illustrate, by way of example, the principles of the invention.

BRIEF DESCRIPTION OF THE DRAWINGS

FIG. 4 is a top view of the joint of FIG. 3.

FIG. 5 is a sectional view of the joint of FIG. 3 during the application of heat and pressure.

FIG. 6 is a sectional view of an alternative heat shield.

FIG. 7 is a sectional view of the hose segment and the alternative heat shield prior to applying heat and pressure to the joint.

DETAILED DESCRIPTION OF THE PREFERRED EMBODIMENT

Figure 1:
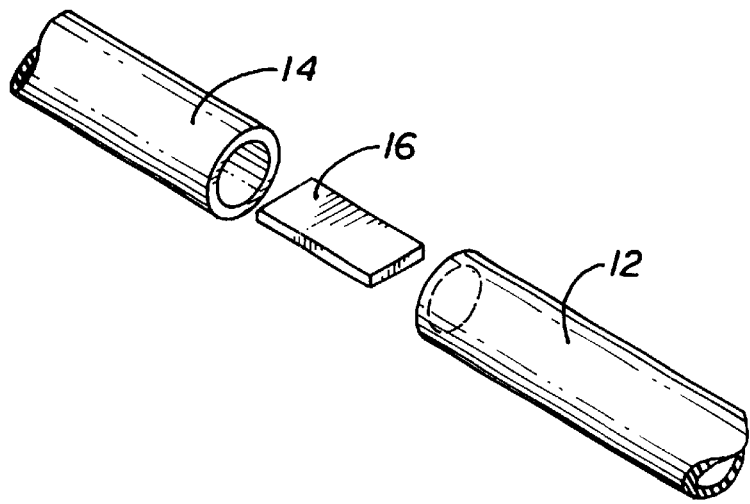
FIG. 1 is an exploded view of the two hose segments to be repaired according to the the method of the present invention.
Figure 2:
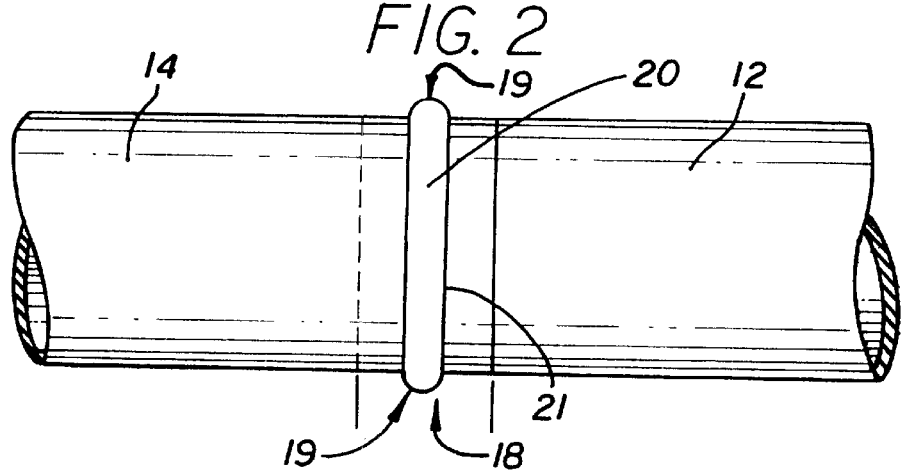
FIG. 2 is a plan view of a splice joint of an irrigation hose of the present invention.
Figure 3:
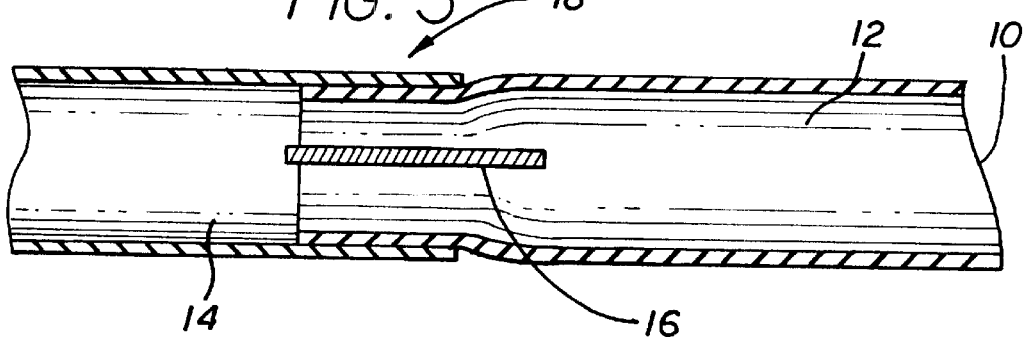
FIG. 3 is a sectional view of the hose segment and heat shield of FIG. 1 as assembled prior to applying heat and pressure to the joint.

As shown in the accompanying drawings (FIGS. 1–5), two pieces of segmented irrigation hose are joined so that one hose segment, a first or inner segment 12, is completely circumscribed by the other hose segment, a second or outer segment 14, creating an overlapping area 18. The hose can be flexible such as a flexible polymer hose or a flexible co-polymer hose with wall thickness ranging from 0.004" to 0.112". Additionally, the flexible polymer hose can be mono-chambered or multi-chambered. An example of multi-chambered hose known as drip tape is described in U.S. Pat. Nos. 5,620,143 issued Apr. 15, 1997; now U.S. Pat. No. 5,695,127 issued Dec. 9, 1997; U.S. Pat. No. 4,473,191 issued Sep. 25, 1984; U.S. Pat. No. 4,247,051 issued Jan. 27, 1981; or U.S. Pat. No. 4,880,167 issued Nov. 14, 1989. An example of the thicker mono-chambered hose is one sold by the Toro Company under the designation OVAL HOSE™.

A flat heat shield 16 is positioned within the inner segment 12 so that, preferably, it will be at least co-extensive with the overlapping area 18. Preferably, the overlapping area 18 is less than one inch in linear length. Located within the boundary of the overlapping area 18 is an irrigation hose splice 20. The hose splice 20 extends transversely to the hose segments 12 and 14 and is composed of material from the inner segment 12 and the outer segment 14 that have been fused together by a heat sealer 22 which applies heat and compressive force as shown in FIG. 5. The fusion of the inner hose segment 12 and the other hose segment 14 creates tabs 19 extending radially beyond the circumference of the non-fused irrigation hose. The fusing also creates two discontinuities 21 extending circumferentially around the irrigation hose.

A repaired irrigation hose splice 20 may be accomplished by first un-coiling two unjoined hose segments, the first segment 12 and the second segment 14, of the irrigation hose from a take-up spool (not shown). Next, the heat shield 16 is inserted into the first or inner segment of hose 12 to prevent the inner circumferential surface on the inner segment 12 from adhering to itself during heat fusion. The width of the heat shield may be preferably about half the circumference of the inner surface of the irrigation hose. The inner segment 12 is then partially inserted into the outer segment of hose 14 creating the overlapping area 18. The inner segment 12 is then heat fused to the outer segment 14. The heat fusion is accomplished by sandwiching the overlapping area 18 in a table top impulse heat sealer 22, or other suitable device such as are known in the art, which provides heat while simultaneously compressing the inner segment 12 and the outer segment 14 preferably at a point intermediate of the overlapping area 18 to form a hose splice 20. One suitable heat sealer is sold by Bradley's Plastic Bag Co. under the designation 400TM. The irrigation hose segments 12. and 14 remain compressed while the heat is removed. The pressure is then removed resulting in a repaired irrigation hose 10. The repaired irrigation hose 10 may then be re-coiled onto a second take-up spool (not shown).

In the preferred embodiment, the heat shield 16 is composed of water soluble material. Examples include water soluble paper or starch based water soluble material. In practice, the heat shield 16 can be composed of any number of materials as long as the material prevents the inner circumferential surface from adhering to itself when the heat and compressive forces are applied. Other examples of suitable materials include waxed paper, fiberglass, cotton, wool, asbestos, and Teflon R.

With reference to FIGS. 6 and 7, another embodiment of a heat shield 24 is composed of two layers, one of which acts to prevent the inner circumferential surface from adhering to itself, the heat resistant material 26, and the other is composed of the same or similar material as the hose, the heat sensitive material 28. The heat shield 24 is applied in a similar fashion as described above in reference to FIGS. 1–5, except that the heat sensitive material 28 in the heat shield 24 fuses with the inner segment 12 when heat and pressure are applied by the heat sealer 22. This alternative embodiment of the heat shield 24 is especially desirable when using multi-chambered flexible hose which has circumferential portions that are mono-chambered (not shown) and circumferential portions that are multi-chambered (not shown). Examples of multi-chambered hose are described in U.S. Pat. Nos. 5,620,143 issued Apr. 15, 1997; U.S. Pat. No. 5,696,127 issued Dec. 9, 1997; U.S. Pat. No. 4,473,191 issued Sep. 25, 1984; U.S. Pat. No. 4,247,051 issued Jan. 27, 1981; and U.S. Pat. No. 4,880,167 issued Nov. 14, 1989. The heat sensitive material 28 in the heat shield 24 prevents the mono-chambered circumferential portions of the hose segments 12 and 14 from being damaged by the application of heat and pressure required to fuse together the thicker multi-chambered portions of the hose segments. The use of the multi-layered heat shield 24 also results in a repaired hose 10 that can withstand greater longitudinal forces, especially prevalent during installation and retrieval of the irrigation hose.

In the preferred embodiment, the application of heat and compressive forces is automated in the heat sealer 22. That is, the heat sealer 22 would contain mechanical and electrical means that perform the sealing process with pre-programmed/pre-determined heat, heat time, cool down time, applied pressure, and duration of the pressure sequence. The heat can be preset in a number of ways including use of an adjustable rheostat control. The pressure can be controlled in a number of ways including using compressed air passing through a pressure regulator and solenoid valve which in turn activates an air piston which pushes the hose flat against the heater filament.

In the preferred embodiment, pressure is applied for about 26 seconds at about 60 psi. The duration of heat application is about 12 seconds when repairing 10 mil Tiger Tape ™ and is applied using an electronic timing device. However, all of the pre-programed/pre-determined settings can be adjusted to optimize quality of the hose splice 20 depending upon the thickness of the irrigation hose being repaired. For example pressure may be applied from 10 seconds for very thin hoses up to 3 minutes for thicker hoses. Likewise, pressure can be applied from 10 psi to 200 psi. Heat temperature will also vary with the thickness of the hose, but should preferably be greater than the melting point of the hose material. Similarly, heat can be applied from 5 seconds to a minute and a half depending upon the thickness of the hose, the pressure, the temperature of the sealer and the width of the hose splice 20. Moreover, such a heat sealer 22 may be portable and battery operated so that it could be operated in the field to repair installed hose without having to retrieve the hose to repair it and later re-install it. For example, one embodiment of a portable heat sealer may resemble a set of pliers (but with a battery operated heating element attached). The method of the present invention also contemplates alternative means of fusing other than using heat. For example, the unjoined segments of hose can be fused together by ultrasonic welding.

The present invention provides a method for easily repairing irrigation hose, including drip tape, with minimal time and equipment in a manner that allows the repaired irrigation hose to be retrieved and re-installed as though it were new or undamaged hose.

While a particular form of the invention has been illustrated and described, it will be apparent that various modifications can be made without departing from the spirit and scope of the invention. Accordingly, it is not intended that the invention be limited by the particular embodiments discussed above, but should be defined only by the claims set forth below and equivalents thereof.

I claim:

1. An irrigation hose splice, comprising:

an inner hose segment and an outer hose segment, said inner hose segment located in the outer hose segment to form an overlapping area, the inner segment having a removable, flat, flexible heat shield located therein proximate the overlapping area; and a splice located on the overlapping area and extending transversely to the inner and outer hose segments, said hose splice consisting essentially of material from the inner hose segment and the outer hose segment that have been fused together by applying heat and pressure to the overlapping area, the heat shield preventing inner circumferential surfaces of the inner hose segment from being fused together.

2. An irrigation hose splice which comprises:

(a) an inner hose segment and an outer hose segment, said inner hose segment having a removable, flat, flexible heat shield located therein proximate an overlapping area and being completely circumscribed by and inserted into the outer hose segment to form the overlapping area; and (b) a splice joint, said splice joint being located withing the overlapping area on a repaired irrigation hose, said splice joint being formed by fusing the inner hose segment to the outer hose segment , said heat shield preventing inner circumferential surfaces of the inner segment from being fused together, said splice joint consisting essentially of material from the inner hose segment and the outer hose segment that have been fused together.

3. The irrigation hose splice of claim 2 further comprising a repaired irrigation hose having longitudinal strength sufficient to allow it to be installed and retrieved in the same manner as a new irrigation hose.

4. The irrigation hose splice of claim 2, wherein the heat shield is removed from the repaired irrigation hose after fusing the inner hose segment to the outer hose segment.

5. The irrigation hose splice of claim 4, wherein the heat shield is water soluble, wherein the water soluble heat shield is removed from the repaired irrigation hose by dissolving the heat shield with water flowing inside the repaired irrigation hose.

6. The irrigation hose splice of claim 4, wherein the heat shield is removed by flushing the heat shield from the repaired irrigation hose with water flowing inside the irrigation hose.

7. The irrigation hose splice of claim 4, wherein the heat shield comprises a material selected from the group consisting of waxed paper, fiberglass, cotton, wool, asbestos and Teflon R.

8. The irrigation hose splice of claim 5, wherein the water soluble heat shield is selected from the group consisting of water soluble paper and starched based water soluble material.

* * * * *